United States Patent
Biondo et al.

(10) Patent No.: US 8,350,690 B2
(45) Date of Patent: Jan. 8, 2013

(54) METHODS AND SYSTEMS FOR CONTROLLING FORWARD LIGHTING FOR VEHICLES

(75) Inventors: William A. Biondo, Beverly Hills, MI (US); David T. Proefke, Madison Heights, MI (US); Clark E. McCall, Ann Arbor, MI (US); Fred W. Huntzicker, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 355 days.

(21) Appl. No.: 12/429,893

(22) Filed: Apr. 24, 2009

(65) Prior Publication Data
US 2010/0271195 A1 Oct. 28, 2010

(51) Int. Cl.
*B60Q 1/26* (2006.01)

(52) U.S. Cl. ........ 340/469; 315/82; 340/457.2; 362/465

(58) Field of Classification Search .................. 340/468, 340/469, 438, 457.2; 362/464, 466, 276, 362/465; 315/77, 82, 83, 291
See application file for complete search history.

(56) References Cited

U.S. PATENT DOCUMENTS

| | | | | | |
|---|---|---|---|---|---|
| 4,323,837 | A | * | 4/1982 | Nakamura et al. | 322/7 |
| 4,684,819 | A | * | 8/1987 | Haag et al. | 315/82 |
| 5,164,701 | A | * | 11/1992 | Nan-Mu et al. | 340/464 |
| 5,382,877 | A | * | 1/1995 | Katsumata et al. | 315/82 |
| 6,919,820 | B2 | * | 7/2005 | Makita et al. | 340/903 |
| 7,438,451 | B2 | * | 10/2008 | Daniel | 362/489 |
| 2004/0008110 | A1 | * | 1/2004 | Stam et al. | 340/469 |

* cited by examiner

*Primary Examiner* — Brent Swarthout
(74) *Attorney, Agent, or Firm* — Ingrassia Fisher & Lorenz, P.C.

(57) ABSTRACT

A method for controlling forward lighting for a vehicle includes the steps of determining whether full forward lighting is required for the vehicle, and varying the forward lighting depending on whether full forward lighting is required.

20 Claims, 3 Drawing Sheets

METHODS AND SYSTEMS FOR CONTROLLING FORWARD LIGHTING FOR VEHICLES

TECHNICAL FIELD

The present invention generally relates to the field of vehicles and, more specifically, to methods and systems for controlling forward lighting for vehicles.

BACKGROUND OF THE INVENTION

Vehicles today commonly use forward lighting when initiated by a driver of the vehicle, for example during evening hours. However, use of forward lighting consumes energy, for example in the form of battery and/or electric energy. While use of forward lighting is important to operating vehicle under various conditions, such as during evening hours, it may be desirable to decrease energy consumption from the use of forward lighting for vehicles to the extent feasible. Certain vehicles today have automatic headlamps using an ambient light sensor to turn on lighting that help to decrease energy consumption when ambient light is high, for example during daylight hours. However, it may be advantageous to achieve further decreases in energy consumption, for example in situations in which ambient light is not high, for example during evening hours.

Accordingly, it is desirable to provide an improved method for controlling use of forward lighting for vehicles, for example that reduces energy consumption from the use of the forward lighting in situations in which ambient light is not high, for example during evening hours. It is also desirable to provide an improved program product for such controlling of forward lighting for vehicles. It is further desirable to provide an improved system for such controlling of forward lighting for vehicles. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method for controlling forward lighting for a vehicle is provided. The method comprises the steps of determining whether full forward lighting is required for the vehicle, and varying the forward lighting depending on whether full forward lighting is required.

In accordance with another exemplary embodiment of the present invention, a program product for controlling forward lighting for a vehicle is provided. The program product comprises a program and a computer-readable signal bearing media. The program is configured to at least facilitate determining whether full forward lighting is required for the vehicle, and varying the forward lighting depending on whether full forward lighting is required. The computer-readable signal bearing media bears the program.

In accordance with a further exemplary embodiment of the present invention, a system for controlling forward lighting for a vehicle is provided. The system comprises an input unit and a processor. The input unit is configured to at least facilitate obtaining one or more input values for use in determining a lighting requirement for the vehicle. The processor is coupled to the input unit, and is configured to at least facilitate determining whether full forward lighting is required for the vehicle using one or more of the input values, and varying the forward lighting depending on whether full forward lighting is required.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

Figure 1:
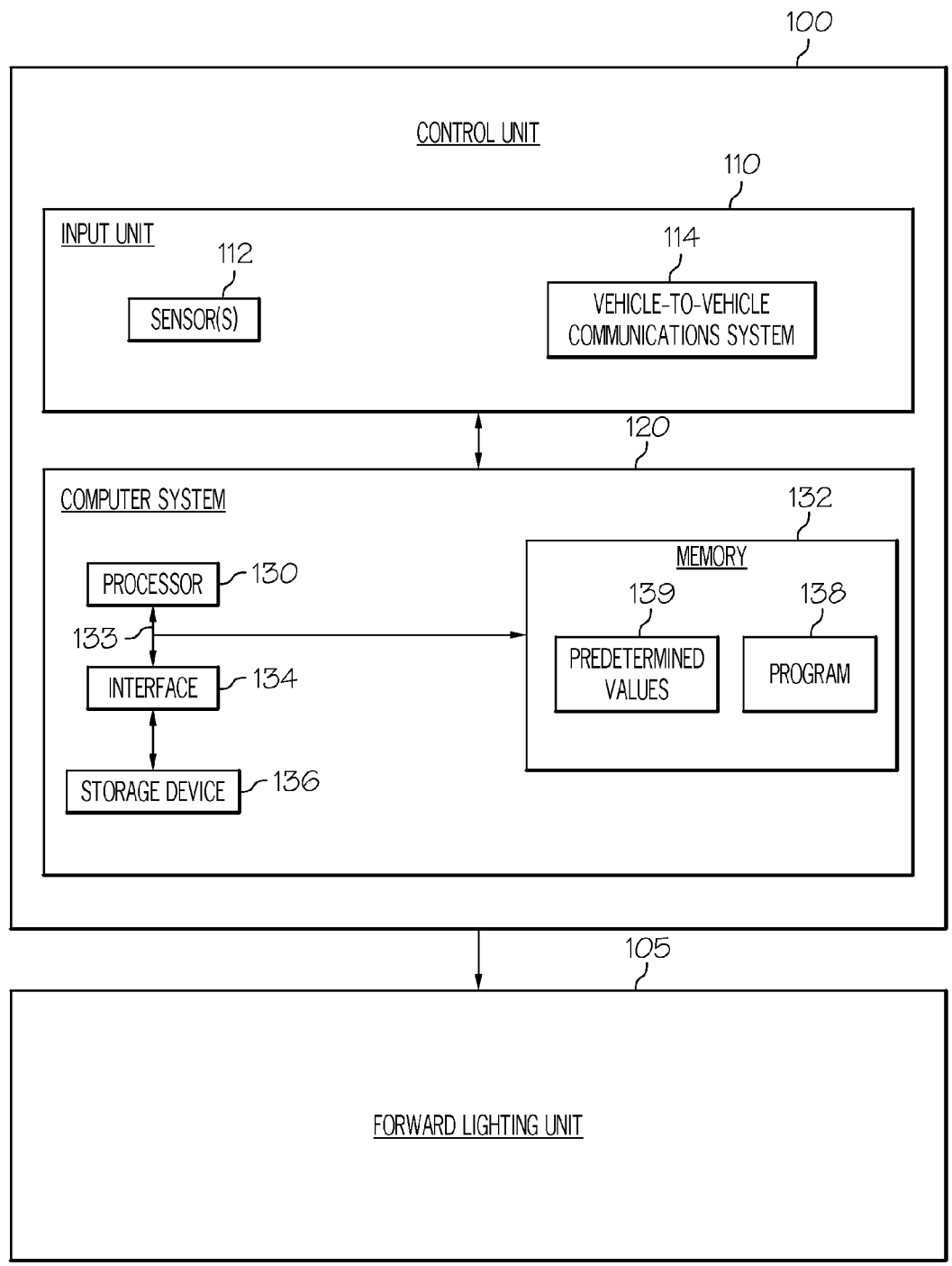
FIG. 1 is a functional block diagram of a control system for controlling forward lighting for a vehicle, in accordance with an exemplary embodiment of the present invention.

FIG. 1 is a functional block diagram of a control system 100 for controlling forward lighting for a vehicle, in accordance with an exemplary embodiment of the present invention. In certain preferred embodiments, the vehicle comprises an automobile such as a sedan, a truck, a van, a sport utility vehicle, or another type of automobile. However, in various embodiments, the control system 100 can be used in connection with any number of types of vehicles and/or systems thereof.

As depicted in FIG. 1, the control system 100 is configured to be coupled to a forward lighting unit 105 of the vehicle. In the depicted embodiment, the control system 100 comprises an input unit 110 and a computer system 120. However, this may vary in other embodiments.

The input unit 110 is configured to obtain and provide input values for use in determining a lighting requirement for the vehicle. In certain exemplary embodiments, the input unit 110 comprises one or more sensors 112 of the vehicle. Certain sensors 112, by way of example, may be disposed proximate one or more wheels of the vehicle in order to ascertain and provide information as to whether the vehicle is moving. Certain other sensors 112, by way of additional example, may be disposed proximate a transmission of the vehicle and/or proximate a control switch therefore in order to ascertain and provide information as to whether the vehicle transmission is in a park mode. Certain other sensors 112, by way of further example, may be disposed proximate near a front end of the vehicle in order to ascertain and provide information as to whether another vehicle is disposed in close proximity to the front end of the vehicle. Certain other sensors 112, by way of yet another example, may be disposed outside the vehicle in order to ascertain and provide information as to ambient lighting surrounding the vehicle. Various other types of sensors 112 may also be utilized in various embodiments of the present invention.

In certain other exemplary embodiments, the input unit 110 comprises a vehicle-to-vehicle communications system 114. The vehicle-to-vehicle communications system 114 ascertains and provides information as to a position of one or more nearby vehicles. Specifically, in one preferred embodiment, the vehicle-to-vehicle communications system 114 ascertains and provides information as to whether a nearby vehicle is within a predetermined distance away from and in front of the vehicle. In certain embodiments, a portion of the vehicle-to-vehicle communications system 114 (for example, a sensor, transmitter, and/or receiver thereof) may reside within or on the vehicle, while other portions may reside away from the vehicle. However, this may vary in other embodiments.

It will be appreciated that in certain embodiments the input unit 110 may include sensors 112 and all or a portion of a vehicle-to-vehicle communications system 114. In other embodiments, the input unit 110 may include one or more sensors 112 without a vehicle-to-vehicle communications system 114, or vice versa. In another exemplary embodiment, the input unit 110 comprises a light sensor and/or camera. In yet other embodiments, the input unit 110 may include any one or more of a number of other different types of units, devices, and/or systems.

The computer system 120 receives the input values from the input unit 110, determines an appropriate amount of forward lighting required for the vehicle using the input values, and controls the forward lighting accordingly for the vehicle. In certain preferred embodiments, the computer system 120 regulates the intensity of the forward lighting for the vehicle by providing appropriate instructions to the forward lighting unit 105 of the vehicle to regulate the intensity of the forward lighting to the amount determined to be required for the vehicle, and to otherwise conserve energy consumption by minimizing any unnecessary use or intensity of the forward lighting. In one embodiment, the computer system 120 is part of a body control module of the vehicle. However, this may vary in other embodiments.

In the depicted embodiment, the computer system 120 includes a processor 130, a memory 132, a bus 133, an interface 134, and a storage device 136. The processor 130 performs the computation and control functions of the computer system 120 or portions thereof. Specifically, in a preferred embodiment, the processor 130 is configured to at least facilitate controlling the forward lighting of the vehicle by implementing steps of one or more processes such as the first process 200 of FIG. 2 and/or the second process 300 of FIG. 3.

The processor 130 may comprise any type of processor or multiple processors, single integrated circuits such as a microprocessor, or any suitable number of integrated circuit devices and/or circuit boards working in cooperation to accomplish the functions of a processing unit. During operation, the processor 130 executes one or more programs 138 preferably stored within the memory 132 and, as such, controls the general operation of the computer system 120.

As referenced above, the memory 132 stores a program or programs 138 that execute one or more embodiments of processes such as the first process 200 described below in connection with FIG. 2, the second process 300 described below in connection with FIG. 3, and/or various steps thereof and/or other processes, such as those described elsewhere herein. In addition, in one preferred embodiment, the memory 132 stores one or more predetermined values 139 for subsequent comparison with the input values obtained from the input unit 110 for determining by the processor 130 of an optimal and/or necessary intensity of the forward lighting for the vehicle.

The memory 132 can be any type of suitable memory. This would include various types of dynamic random access memory (DRAM) such as SDRAM, various types of static RAM (SRAM), and various types of non-volatile memory (PROM, EPROM, and flash). It should be understood that the memory 132 may be a single type of memory component, or it may be composed of many different types of memory components. In addition, the memory 132 and the processor 130 may be distributed across several different computers. For example, a portion of the memory 132 may reside on a computer within a particular apparatus or process, and another portion may reside on a remote computer.

The bus 133 serves to transmit programs, data, status, and other information or signals between the various components of the computer system 120. The bus 133 can be any suitable physical or logical means of connecting computer systems and components. This includes, but is not limited to, direct hard-wired connections, fiber optics, and infrared and wireless bus technologies.

The interface 134 allows communication to the computer system 120, for example from a vehicle user, a system operator, and/or another computer system, and can be implemented using any suitable method and apparatus. In a preferred embodiment, the interface 134 provides information to the processor 130 for use in controlling the forward lighting of the vehicle.

The storage device 136 can be any suitable type of storage apparatus, including direct access storage devices such as hard disk drives, flash systems, floppy disk drives and optical disk drives. In one exemplary embodiment, the storage device 136 is a program product from which memory 132 can receive a program 138 that executes one or more embodiments of the first process 200 of FIG. 2 and/or the second process 300 of FIG. 3 and/or steps thereof as described in greater detail further below. In one preferred embodiment, such a program product can be implemented as part of, inserted into, or otherwise coupled to the control system 100. As one exemplary implementation, the computer system 120 may also utilize an Internet website, for example for providing or maintaining data or performing operations thereon.

It will be appreciated that while this exemplary embodiment is described in the context of a fully functioning computer system for the computer system 120, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 120 depicted in FIG. 1 may comprise any one or more of a number of other types of control modules and/or computer systems in various other embodiments of the present invention. In addition, in certain embodiments, the input unit 110 may be part of the computer system 120 and/or may be part of one or more other different computer systems and/or other systems and/or devices.

Figure 2:
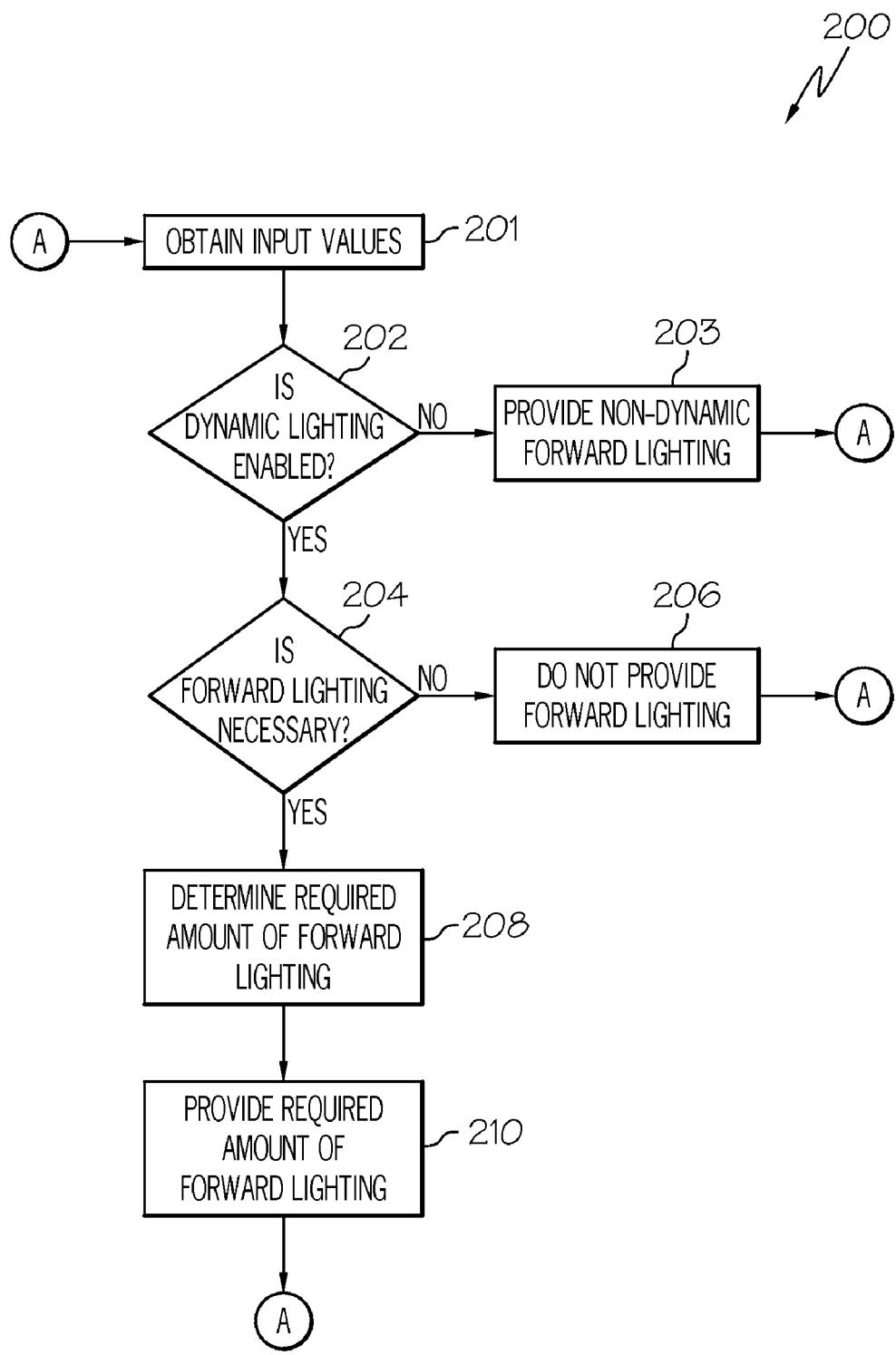
FIG. 2 is a flowchart of a process for controlling forward lighting in a vehicle, and that can be implemented in connection with the control system of FIG. 1, in accordance with an exemplary embodiment of the present invention.

FIG. 2 is a flowchart of a process 200 for controlling forward lighting for a vehicle, in accordance with an exemplary embodiment of the present invention. In a preferred embodiment, the first process 200 can be implemented in connection with the control system 100 of FIG. 1 and/or through program products that can be utilized in connection therewith in controlling forward lighting of a vehicle. However, it will be appreciated that in various embodiments the first process 200 may also be utilized in connection with any number of different types of systems and/or other devices.

As depicted in FIG. 2, the first process 200 includes the step of obtaining input values (step 201). The input values represent variable values for use in determining a lighting requirement for the vehicle. In certain exemplary embodiments, the input values comprise one or more of the following: information as to movement of the vehicle, information as to the proximity of any nearby vehicles, information as to the status of a transmission of the vehicle, and/or information as to ambient light conditions proximate the vehicle, among other possible types of input values. In addition, in certain embodiments, the input values comprise one or more of the following: a driver request for forward lighting and/or a driver's request to enable or disable dynamic forward lighting. In a preferred embodiment the input values are obtained by the input unit 110 of FIG. 1, such as one or more sensors 112 and/or vehicle-to-vehicle communications systems 114 thereof, and are provided to the processor 130 of the computer system 120 of FIG. 1. However, this may vary in other embodiments.

A determination is made as to whether dynamic lighting is enabled (step 202). In a preferred embodiment, this determination is made by the processor 130 of FIG. 1 using the input values obtained from the input unit 110 of FIG. 1 in accordance with the above-described step 201. In certain embodiments, dynamic lighting is considered to be enabled if a driver of the vehicle has engaged a dynamic lighting enable switch or has otherwise requested that dynamic lighting be enabled. In certain other embodiments, dynamic lighting is considered to be enabled unless a driver of the vehicle has engaged a dynamic lighting disable switch or has otherwise requested that dynamic lighting be disabled. In certain other embodiments, dynamic lighting may be automatically enabled or disabled by the control unit 100 or otherwise by the vehicle.

If a determination is made that dynamic lighting is not enabled, then non-dynamic forward lighting is provided (step 203). In a preferred embodiment, the non-dynamic forward lighting comprises standard forward lighting as typically provided in today's vehicles. The process then preferably re-starts with step 201, and new input values are obtained, provided that the vehicle is still in operation.

Conversely, if a determination is made that dynamic lighting is enabled, then the process proceeds instead to step 204. In step 204, a determination is made as to whether forward lighting is necessary. In a preferred embodiment, this determination is made by the processor 130 of FIG. 1 using the input values obtained from the input unit 110 of FIG. 1 in accordance with the above-described step 201. Also in a preferred embodiment, the processor 130, in making this determination, utilizes criteria such as those described further below in connection with FIG. 3, such as whether the vehicle is stationary, whether a transmission of the vehicle is in a park mode, whether ambient light surrounding the vehicle is greater than a predetermined threshold, and/or whether another vehicle is within a predetermined distance in front of the vehicle, among other possible criteria.

If it is determined in step 204 that forward lighting is not necessary for the vehicle, then forward lighting is not provided (step 206). This step is preferably accomplished by the processor 130 of FIG. 1 by providing instructions for the forward lighting unit 105 to temporarily power off and/or to temporarily to remain with the power off. The process then preferably re-starts with step 201, and new input values are obtained, provided that the vehicle is still in operation.

Conversely, if it is determined in step 204 that forward lighting is necessary for the vehicle, then a determination is made as to a required amount of forward lighting (step 208). This determination is preferably made by the processor 130 of FIG. 1 using the above-referenced input values obtained in step 201 and also preferably using criteria such as those described further below in connection with FIG. 3, such as whether the vehicle is stationary, whether a transmission of the vehicle is in a park mode, whether ambient light surrounding the vehicle is greater than a predetermined threshold, and/or whether another vehicle is within a predetermined distance in front of the vehicle, among other possible criteria. The required amount of forward lighting is then provided (step 210), preferably through control of the forward lighting unit 105 of FIG. 1 via the processor 130 of FIG. 1. The process then preferably re-starts with step 201, and new input values are obtained, provided that the vehicle is still in operation.

It will be appreciated that certain steps of the first process 200 may differ from and/or may be performed simultaneously or in a different order than those depicted in FIG. 1 and described herein. For example, in certain embodiments, a minimum threshold intensity of forward lighting may be required in any circumstances. In yet other embodiments, the process may use a predetermined number of different levels of intensity for the forward lighting (for example, a full forward lighting intensity and a reduced forward lighting intensity).

Figure 3:
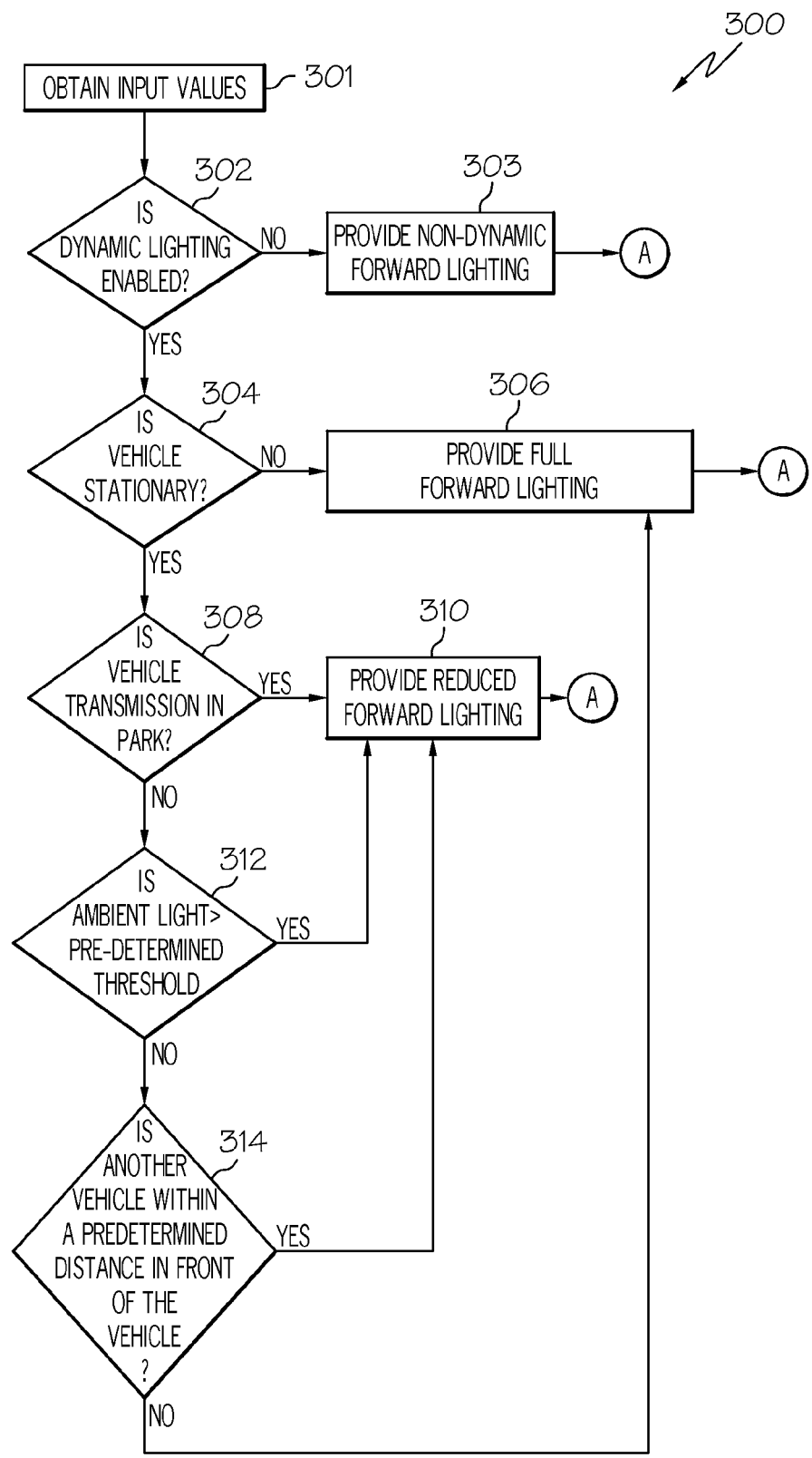
FIG. 3 is a flowchart of a process for controlling forward lighting in a vehicle, and that can be implemented in connection with the control system of FIG. 1, in accordance with another exemplary embodiment of the present invention.

FIG. 3 depicts another exemplary embodiment of a second process 300 for controlling forward lighting in a vehicle. In a preferred embodiment, the second process 300 can be implemented in connection with the control system 100 of FIG. 1 and/or through program products that can be utilized in connection therewith in controlling forward lighting of a vehicle. However, it will be appreciated that in various embodiments the second process 300 may also be utilized in connection with any number of different types of systems and/or other devices.

As depicted in FIG. 3, the second process 300 includes the step of obtaining input values (step 301). The input values represent variable values for use in determining a lighting requirement for the vehicle. In certain exemplary embodiments, the input values comprise one or more of the following: information as to movement of the vehicle, information as to the proximity of any nearby vehicles, information as to the status of a transmission of the vehicle, and/or information as to ambient light conditions proximate the vehicle, among other possible types of input values. In a preferred embodiment the input values are obtained by the input unit 110 of FIG. 1, such as one or more sensors 112 and/or vehicle-to-vehicle communications systems 114 thereof and provided to the processor 130 of the computer system 120 of FIG. 1. However, this may vary in other embodiments.

A determination is made as to whether dynamic lighting is enabled (step 302). In a preferred embodiment, this determination is made by the processor 130 of FIG. 1 using the input values obtained from the input unit 110 of FIG. 1 in accordance with the above-described step 301. In certain embodiments, dynamic lighting is considered to be enabled if a driver of the vehicle has engaged a dynamic lighting enable switch or has otherwise requested that dynamic lighting be enabled. In certain other embodiments, dynamic lighting is considered to be enabled unless a driver of the vehicle has engaged a dynamic lighting disable switch or has otherwise requested that dynamic lighting be disabled. In certain other embodiments, dynamic lighting may be automatically enabled or disabled by the control unit 100 or otherwise by the vehicle.

If a determination is made that dynamic lighting is not enabled, then non-dynamic forward lighting is provided (step 303). In a preferred embodiment, the non-dynamic forward lighting comprises standard forward lighting as typically provided in today's vehicles. The process then preferably re-starts with step 301, and new input values are obtained, provided that the vehicle is still in operation.

Conversely, if a determination is made that dynamic lighting is enabled, then the process proceeds instead to step 304. In step 304, a determination is made as to whether the vehicle is stationary. In a preferred embodiment, this determination is made by the processor 130 of FIG. 1 using one or more of the input values obtained from the input unit 110 of FIG. 1 in accordance with the above-described step 301. Also in a preferred embodiment, the processor 130 utilizes information from one or more of the sensors 112, for example one or more such sensors 112 proximate one or more wheels of the vehicle.

If it is determined in step 304 that the vehicle is not stationary, then full forward lighting is provided (step 306). In a preferred embodiment, full forward lighting represents an intensity of the forward lighting that is consistent with normal, everyday driving during requiring forward lighting, for example during evening hours. Also in a preferred embodiment, the full forward lighting is provided by the forward lighting unit 105 of FIG. 1 using instructions provided by the processor 130 of FIG. 1. The process then preferably re-starts with step 301, and new input values are obtained, provided that the vehicle is still in operation.

Conversely, if it is determined in step 304 that the vehicle is stationary, then a determination is made as to whether a transmission of the vehicle is in a park mode (step 308). In a preferred embodiment, this determination is made by the processor 130 of FIG. 1 using one or more of the input values obtained from the input unit 110 of FIG. 1 in accordance with the above-described step 301. Also in a preferred embodiment, the processor 130 utilizes information from one or more of the sensors 112, for example one or more such sensors 112 proximate the transmission for the vehicle and/or a control switch for the transmission. The process then preferably re-starts with step 301, and new input values are obtained, provided that the vehicle is still in operation.

If it is determined in step 308 that the vehicle transmission is in the park mode, then reduced forward lighting is provided (step 310). In a preferred embodiment, the reduced forward lighting represents an intensity of the forward lighting that is substantially less than that required for normal, everyday driving during requiring forward lighting, for example during evening hours. In one exemplary embodiment, the reduced forward lighting is less than half the intensity of the full forward lighting. In yet another exemplary embodiment, the reduced forward lighting is equal to a minimum forward lighting intensity as may be required by applicable law. In still another exemplary embodiment, the reduced forward lighting may be approximately equal to a zero lighting intensity and/or the forward lighting may be turned off during the reduced forward lighting. In a preferred embodiment, the reduced forward lighting is provided by the forward lighting unit 105 of FIG. 1 using instructions provided by the processor 130 of FIG. 1. The process then preferably re-starts with step 301, and new input values are obtained, provided that the vehicle is still in operation.

Conversely, if it is determined in step 308 that the vehicle transmission is not in the park mode, then a determination is made as to whether ambient light in proximity to the vehicle is greater than a predetermined ambient light intensity threshold (step 312). In a preferred embodiment, the predetermined ambient light intensity threshold represents a threshold intensity of ambient light above which full forward lighting is not required, at least when the vehicle is stationary. Also in a preferred embodiment, this determination is made by the processor 130 of FIG. 1 using one or more of the input values obtained from the input unit 110 of FIG. 1 in accordance with the above-described step 301. For example, in one such preferred embodiment, the processor 130 utilizes information from one or more of the sensors 112, for example one or more such sensors 112 outside the vehicle, and compares this information with one or more of the predetermined values 139 stored in the memory 132 of FIG. 1. However, this may vary in other embodiments.

If it is determined in step 312 that the ambient light surrounding the vehicle is greater than the predetermined ambient light threshold, then the process proceeds to step 310, and the reduced forward lighting, if any, is provided, as described above. The process then preferably re-starts with step 301, and new input values are obtained, provided that the vehicle is still in operation.

Conversely, if it is determined in step 312 that the ambient light surrounding the vehicle is less than or equal to the predetermined ambient light threshold, then a determination is made as to whether another vehicle is directly in front of the vehicle and within a predetermined distance of the vehicle (step 314). In one preferred embodiment, the predetermined distance is equal to one meter; however, this may vary in other embodiments. Also in one preferred embodiment, this determination is made by the processor 130 of FIG. 1 using input values obtained in step 301 from the input unit 110 of FIG. 1, for example from one or more sensors 112 and/or vehicle-to-vehicle communications systems 114 thereof, and comparing these input values with one or more of the predetermined values 139 stored in the memory 132 of FIG. 1. However, this may vary in other embodiments.

If it is determined in step 314 that another vehicle is directly in front of the vehicle and within a predetermined distance of the vehicle, then the process proceeds to step 310, and reduced forward lighting is provided, if any, as described above. The process then preferably re-starts with step 301, and new input values are obtained, provided that the vehicle is still in operation.

Conversely, if it is determined in step 314 that there is no other vehicle that is directly in front of the vehicle within a predetermined distance of the vehicle, then the process proceeds instead to step 306, and full forward lighting is provided, as described above. The process then preferably re-starts with step 301, and new input values are obtained, provided that the vehicle is still in operation.

Thus, full forward lighting is provided when required for the vehicle (step 306). However, in situations in which full forward lighting is not required (for example, in situations in which the vehicle is stationary and transmission is in a park mode, or when the vehicle is stationary and the ambient light is greater than a predetermined threshold, or when the vehicle is stationary and another vehicle is directly in front of and in close proximity to the vehicle), then forward lighting is reduced in intensity (or, in some embodiments, turned off) in order to reduce energy consumption.

It will be appreciated that various steps of the second process 300 may vary from those depicted in FIG. 3 and/or described herein. It will similarly be appreciated that various steps of the second process 300 may occur simultaneously with one another and/or in an order that differs from that depicted in FIG. 3 and/or described herein.

Accordingly, improved methods, program products, and systems are provided for controlling forward lighting for vehicles. The improved methods, program products, and systems allow for the providing of full forward lighting when required for the vehicle, and also allowing for reduced energy consumption via a reduced forward lighting when such full forward lighting is not required.

It will be appreciated that, in various embodiments, the disclosed methods, program products, and systems may vary from those depicted in the figures and described herein. It will similarly be appreciated that, while the disclosed methods, program products, and systems are described above as being used in connection with automobiles such as sedans, trucks, vans, and sports utility vehicles, the disclosed methods, program products, and systems may also used in connection with any number of different types of vehicles, and in connection with any number of different systems thereof and environments pertaining thereto.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling forward lighting for a vehicle, the method comprising the steps of:
   determining whether the vehicle is stationary;
   providing full forward lighting in a fixed amount with a fixed light intensity if the vehicle is not stationary; and
   varying the forward lighting between multiple light intensities based on a plurality of conditions other than the vehicle being stationary via a processor only if the vehicle is stationary.

2. The method of claim 1, further comprising the step of:
   determining whether full forward lighting is required for the vehicle; and
   providing reduced forward lighting with a light intensity that is greater than zero and less than the fixed light intensity of the full forward lighting, if the vehicle is stationary and full forward lighting is not required.

3. The method of claim 2, further comprising the steps of:
   determining whether a second vehicle is stationary and disposed within a predetermined distance in front of the vehicle; and
   providing reduced forward lighting only on the further condition that the second vehicle is stationary and disposed within a predetermined distance in front of the vehicle.

4. The method of claim 2, further comprising the steps of:
   determining whether a transmission of the vehicle is in a park mode; and
   providing reduced forward lighting only on the further condition that the transmission of the vehicle is in the park mode.

5. The method of claim 2, further comprising the step of:
   determining a measure of brightness of ambient light proximate the vehicle;
   wherein the step of proving reduced forward lighting comprises the step of providing reduced forward lighting provided that the vehicle is stationary and the measure of brightness is less than a predetermined threshold.

6. The method of claim 5, further comprising the step of:
   determining whether a second vehicle is within a predetermined distance in front of the vehicle;
   wherein the step of providing the reduced forward lighting comprises the step of providing the reduced forward lighting provided that each of the following conditions are satisfied, namely, that the vehicle is stationary, the measure of brightness is less than the predetermined threshold, and the second vehicle is within the predetermined distance in front of the vehicle.

7. A program product for controlling forward lighting for a vehicle, the program product comprising:
   (a) a program configured to at least facilitate:
      determining whether the vehicle is stationary;
      providing full forward lighting in a fixed amount with a fixed light intensity if the vehicle is not stationary; and
      varying the forward lighting between multiple light intensities based on a plurality of conditions other than the vehicle being stationary via a processor only if the vehicle is stationary; and
   (b) a non-transitory, computer-readable storage medium bearing the program.

8. The program product of claim 7, wherein the program is further configured to at least facilitate:
   determining whether full forward lighting is required for the vehicle; and
   providing reduced forward lighting with a light intensity that is greater than zero and less than the fixed light intensity of the full forward lighting, if the vehicle is stationary and full forward lighting is not required.

9. The program product of claim 8 wherein the program is further configured to at least facilitate:
   determining whether a transmission of the vehicle is in a park mode; and
   providing reduced forward lighting only on the further condition that the transmission of the vehicle is in the park mode.

10. The program product of claim 8, wherein the program is further configured to at least facilitate:
    determining a measure of brightness of ambient light proximate the vehicle; and
    providing reduced forward lighting only provided that the vehicle is stationary and the measure of brightness is less than a predetermined threshold.

11. The program product of claim 10, wherein the program is further configured to at least facilitate:
    determining whether a second vehicle is within a predetermined distance in front of the vehicle;
    providing the reduced forward lighting provided that each of the following conditions are satisfied, namely, that the vehicle is stationary, the measure of brightness is less than the predetermined threshold, and the second vehicle is within the predetermined distance in front of the vehicle.

12. A system for controlling forward lighting for a vehicle, the system comprising:
    an input unit configured to at least facilitate obtaining one or more input values for use in determining a lighting requirement for the vehicle; and
    a processor coupled to the input unit, the processor configured to at least facilitate:
       determining whether the vehicle is stationary using one or more of the input values;
       providing full forward lighting in a fixed amount with a fixed light intensity if the vehicle is not stationary; and
       varying the forward lighting between multiple light intensities based on a plurality of conditions other than the vehicle being stationary via a processor only if the vehicle is stationary.

13. The system of claim 12, wherein the processor is further configured to at least facilitate:
    determining whether full forward lighting is required for the vehicle using one or more of the input values; and providing reduced forward lighting with a light intensity that is greater than zero and less than the fixed light intensity of the full forward lighting, if the vehicle is stationary and full forward lighting is not required.

14. The system of claim 13, wherein the processor is further configured to at least facilitate:

determining whether a second vehicle is stationary and disposed within a predetermined distance in front of the vehicle using one or more of the input values; and providing reduced forward lighting only on the further condition that the second vehicle is stationary and disposed within a predetermined distance in front of the vehicle.

15. The system of claim 13, wherein the processor is further configured to at least facilitate:

determining whether a transmission of the vehicle is in a park mode using one or more of the input values; and providing reduced forward lighting only on the further condition that the transmission of the vehicle is in the park mode.

16. The system of claim 13, wherein the processor is further configured to at least facilitate:

determining a measure of brightness of ambient light proximate the vehicle using one or more of the input values; and providing reduced forward lighting provided that the vehicle is stationary and the measure of brightness is less than a predetermined threshold.

17. The system of claim 16, wherein the processor is further configured to at least facilitate:

determining whether a second vehicle is within a predetermined distance in front of the vehicle;

providing the reduced forward lighting provided that each of the following conditions are satisfied, namely, that the vehicle is stationary, the measure of brightness is less than the predetermined threshold, and the second vehicle is within the predetermined distance in front of the vehicle.

18. The method of claim 1, wherein the varying of the forward lighting is provided only if the vehicle is stationary.

19. The program product of claim 7, wherein the varying of the forward lighting is provided only if the vehicle is stationary.

20. The system of claim 12, wherein the varying of the forward lighting is provided only if the vehicle is stationary.

* * * * *